United States Patent
Benveniste (10) Patent No.: US 7,570,613 B2
(45) Date of Patent: Aug. 4, 2009

(54) ORGANIZATION OF AUTOMATIC POWER SAVE DELIVERY BUFFERS AT AN ACCESS POINT

(75) Inventor: Mathilde Benveniste, South Orange, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 418 days.

(21) Appl. No.: 11/111,580

(22) Filed: Apr. 21, 2005

(65) Prior Publication Data

US 2005/0237984 A1    Oct. 27, 2005

Related U.S. Application Data

(60) Provisional application No. 60/563,803, filed on Apr. 21, 2004.

(51) Int. Cl.
*H04W 4/00* (2006.01)
*H04B 7/185* (2006.01)

(52) U.S. Cl. .................. 370/328; 370/318; 455/574

(58) Field of Classification Search ............ 370/318, 370/395.42; 455/574, 512
See application file for complete search history.

(56) References Cited

U.S. PATENT DOCUMENTS

| | | | |
|---|---|---|---|
| 2002/0089989 A1* | 7/2002 | Christensen et al. | 370/395.42 |
| 2003/0123479 A1* | 7/2003 | Lee et al. | 370/466 |
| 2003/0186724 A1* | 10/2003 | Tsutsumi et al. | 455/561 |
| 2005/0009578 A1* | 1/2005 | Liu | 455/574 |
| 2005/0018624 A1* | 1/2005 | Meier et al. | 370/318 |
| 2005/0135302 A1* | 6/2005 | Wang et al. | 370/329 |
| 2005/0254459 A1* | 11/2005 | Qian | 370/328 |

OTHER PUBLICATIONS

Benveniste, M., et al., "Proposed Normative Text for Simplified APSD," 2003.
European Search Report for Application No. 05252488.1-2416 PCT 2002.
Grilo, A., and Nunes, M, "Performance Evaluation of IEEE 802. 11E," 2002.
IEEE 802 Committee of the IEEE Computer Society, "Draft Amendment to Standard [for] Information Technology—Telecommunications and Information Exchange Between Systems—LAN/MAN Specific Requirements—Part 11: Wireless Medium Access Control (MAC) and Physical Layer (PHY) specifications: Medium Access Control (MAC) Quality of Service (QoS) Enhancements," 2004.

(Continued)

Primary Examiner—Lester Kincaid
Assistant Examiner—Daniel Lai
(74) Attorney, Agent, or Firm—Chapin IP Law, LLC (57) ABSTRACT

A method and apparatus providing delivery of buffered frames in a Wireless Local Area Network (WLAN) is presented. The method and apparatus determines an occurrence of at least one non-APSD station in said WLAN, and when at least one non-Automatic Power Save Delivery (APSD) station is found, then maintains a legacy power saving buffer for each non-APSD station. The method and apparatus also determines an occurrence of at least one APSD station in the WLAN, and when at least one APSD station is found, then maintains at least one APSD buffer for each APSD enabled station. During a service period, frames are transmitted from the at least one APSD buffer.

20 Claims, 6 Drawing Sheets

OTHER PUBLICATIONS

LAN MAN Standards Committee of the IEEE Computer Society, "*Information Technology—Telecommunications and information exchange between sytems—Local and metropolitan area networks—Specific requirements—Part 11: Wireless LAN Medium Access Control (MAC) and Physical Layers (PHY) Specifications*," 2003.

Mangold, S., et al. "*IEEE 802.11e Wireless LAN for Quality of Service*," undated.

* cited by examiner

ORGANIZATION OF AUTOMATIC POWER SAVE DELIVERY BUFFERS AT AN ACCESS POINT

CROSS REFERENCE TO RELATED APPLICATIONS

The present application claims the benefit of U.S. Provisional Patent Application No. 60/563,803, filed on Apr. 21, 2004, which is incorporated herein by reference.

BACKGROUND

A wireless local area network (WLAN) typically includes an Access Point (AP) and one or more stations. Each station may be a device such as a notebook computer, personal digital assistant (PDA), wireless Voice over Internet Protocol (VoIP) telephone or the like that transmits radio signals to and receives radio signals from other stations in the local area network via the AP.

APs and stations transmit data in units referred to as frames over a shared-communications channel. Frames transmitted from a station to an AP are referred to as uplink frames, and frames transmitted from an AP to a station are referred to as downlink frames. In a situation where two or more stations (or an AP and a station) transmit frames simultaneously, then one or more of the frames can become corrupted, referred to as a collision. As a result, WLANs typically employ one or more protocols to ensure that a station or AP can gain exclusive access to the shared-communications channel for a predetermined interval of time in order to transmit its frames without collisions occurring. Certain wireless network protocols (e.g., Institute of Electrical and Electronics Engineers [IEEE] 802.11, etc.) provide for the AP to periodically broadcast a special frame called a beacon that can be heard by the stations in the BSA (basic service area), the area covered by the AP. The beacon contains a variety of information that enables the stations to establish and maintain communications in an orderly fashion, such as a timestamp, which enables stations to synchronize their local clocks, and signaling information (e.g., channel number, frequency hopping pattern, dwell time, etc.).

A station can prolong its battery life by powering off its radio when not transmitting or receiving. When a station powers off its radio, the station is said to enter the "doze" state. A station wakes up from the doze state by powering on its radio to enter the "awake" state. While a station is in the doze state, it cannot transmit or receive signals, and is said to be asleep. A station that saves battery life by alternating between alert states and doze states is said to be in power save (PS) mode, and a station that employs PS mode is said to be a power saving station.

While a station is asleep, the AP buffers any downlink frames for the station for eventual delivery when station is in the awake state.

One method for receiving buffered frames is described in the IEEE 802.11—1999 standard, and is referred to herein as the "legacy" power save method. In this method, an AP periodically includes a Traffic Indication Map (TIM) in the beacon to identify which stations in power-save mode have downlink frames waiting in the AP's buffer for transmission.

In accordance with legacy power save method, stations in the doze state wake up to receive beacons and check the TIM. If the TIM indicates that there are frames buffered for the station, the station will send a PS Poll to request delivery of a buffered frame. To use PS polls, a station listens to the TIM in a beacon to determine if the AP has buffered frames for the station. When there are buffered frames for the station at the AP, the station sends a PS Poll to the AP signaling to the AP that the station is awake and waiting to receive a buffered frame. The AP sends a buffered frame to the station. If the frame has the "More Data" bit set to 1, indicating that there are more buffered frames for the station, the station will send another PS Poll to get another buffered frame. This is repeated until the AP has no more frames for the station.

When the TIM indicates that there are no buffered downlink frames for a station, the station goes back into the doze state. The downlink frames are retrieved with PS polls.

Another strategy for delivering buffered packets in the AP to the appropriate station is known as Automatic Power Save Delivery (APSD), wherein the delivery of downlink buffered frames occurs without the need for PS Polls to indicate that the PS station is awake and ready to receive transmitted frames. There are two types of APSD: (i) scheduled APSD and (ii) unscheduled APSD. The two APSD variants differ with respect to initiation of the 'service period', which is the time period during which the PS station is presumed awake and able to receive a frame transmitted by the AP. With scheduled APSD, the service period starts automatically—that is, without special signaling frames to notify the AP that a station is awake and ready to receive frames. With unscheduled APSD, the transmission of an uplink frame is sufficient to signal the start of the service period, i.e., that the station is awake and ready to receive transmitted frames. The unscheduled service period begins when the AP receives from the station a Quality of Service (QoS) Data/Null frame. The station may elect to limit the Access Category (AC) of the frame that may initiate a service period. The AC(s) of the frames that may initiate a service period are designated by the station to through signaling such as an APSD TSPEC.

Another feature of APSD relates to the termination of the service period, the time interval a PS station must remain awake. Unlike legacy power save, where a PS station may go to sleep after receiving a single frame from the AP, APSD requires a PS station to stay awake to receive several buffered frames, and go to back to sleep only when it is notified by the AP. The AP sets the EOSP (end of service period) bit to 1 in the last frame it transmits in order to signal to the station that it will not transmit any more frames downlink until the next service period. This signals the station that it can go back to sleep.

SUMMARY

Conventional mechanisms such as those explained above suffer from a variety of deficiencies. One such deficiency is that with the QoS protocol, 802.11e, there are insufficient fields to indicated the priority of the frames buffered. Certain devices, having urgent tasks to be performed, may wish to know this priority for the proper scheduling of the retrieval of buffered frames relative to other tasks.

According to the unscheduled APSD power delivery mechanism specified in IEEE 802.11e Draft 8.0, the AP transmits all buffered frames during a service period, before the power-saving station may go to sleep. The More Data bit, when set to 0, would indicate that all frames were transmitted. This can result in at least two problems. One problem is priority inversion. If the AP must transmit the contents of the APSD buffer to the power-saving station before transmitting any frames to other stations, lower-priority frames for the power-saving station would be transmitted before higher priority frames to other stations.

Another problem associated with unscheduled APSD method as proposed to date is battery exhaustion, which may occur when the AP interrupts transmission to a power-saving station in order to transmit higher priority frames to other stations; it could keep the station awake too long.

Conventional legacy power save is inefficient. PS polls are inefficient to use if long packet bursts are buffered, as a PS poll is needed for every frame. Exiting and returning to power save mode is inefficient for independently arriving frames, as it involves two extra frames for each buffered frame that is retrieved.

One cannot tell which is the right legacy option to use because a TIM cannot indicate how much traffic is buffered. One could add priority-specific TIMs in the beacon, and extend the QoS control field to make room for priority-specific More Data bits in order to provide the priority of buffered traffic. This, however, is deemed impractical.

Further, systems employing the unscheduled APSD method as proposed to date does not efficiently retrieve non-periodic bursty traffic, as the definition of the TIM is limited to a subset of buffered frames only, those whose delivery relies on the legacy power save mechanism. Frames to be retrieved through unscheduled APSD would not be included in the TIM.

Embodiments of the invention significantly overcome such deficiencies and provide mechanisms and techniques for organization of automatic power save delivery buffers at an access point. In a particular embodiment of a method for organization of automatic power save delivery buffers at an access point, the method includes determining an occurrence of at least one non-APSD station in a WLAN, and when at least one non-Automatic Power Save Delivery (APSD) station is found, then maintaining a legacy power saving buffer for each non-APSD station. Similarly, the method also includes determining an occurrence of at least one APSD station in the WLAN, and when at least one APSD station is found, then maintaining at least one APSD buffer for each APSD enabled station. The method further includes transmitting, during a service period, frames from at least one APSD buffer.

Another embodiment of the invention includes an Access Point (AP) comprising a processor, a memory in communication with the processor, a receiver in communication with the processor and with a shared communications channel, a transmitter in communication with the processor and with the shared communications channel. The transmitter includes a legacy power saving buffer for each non-Automatic Power Save Delivery (APSD) station of a Wireless Local Area Network (WLAN) the AP is in communication with, and at least one APSD buffer for each APSD enabled station of the WLAN. The AP is operational such that, during a service period, frames from the at least one APSD buffer are transmitted by the transmitter across said shared communications channel to an APSD enabled station.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides mechanisms and techniques for organization of automatic power save delivery buffers at an access point as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing mechanisms and techniques for organization of automatic power save delivery buffers at an access point as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a diagram of and

DETAILED DESCRIPTION

Figure 1:
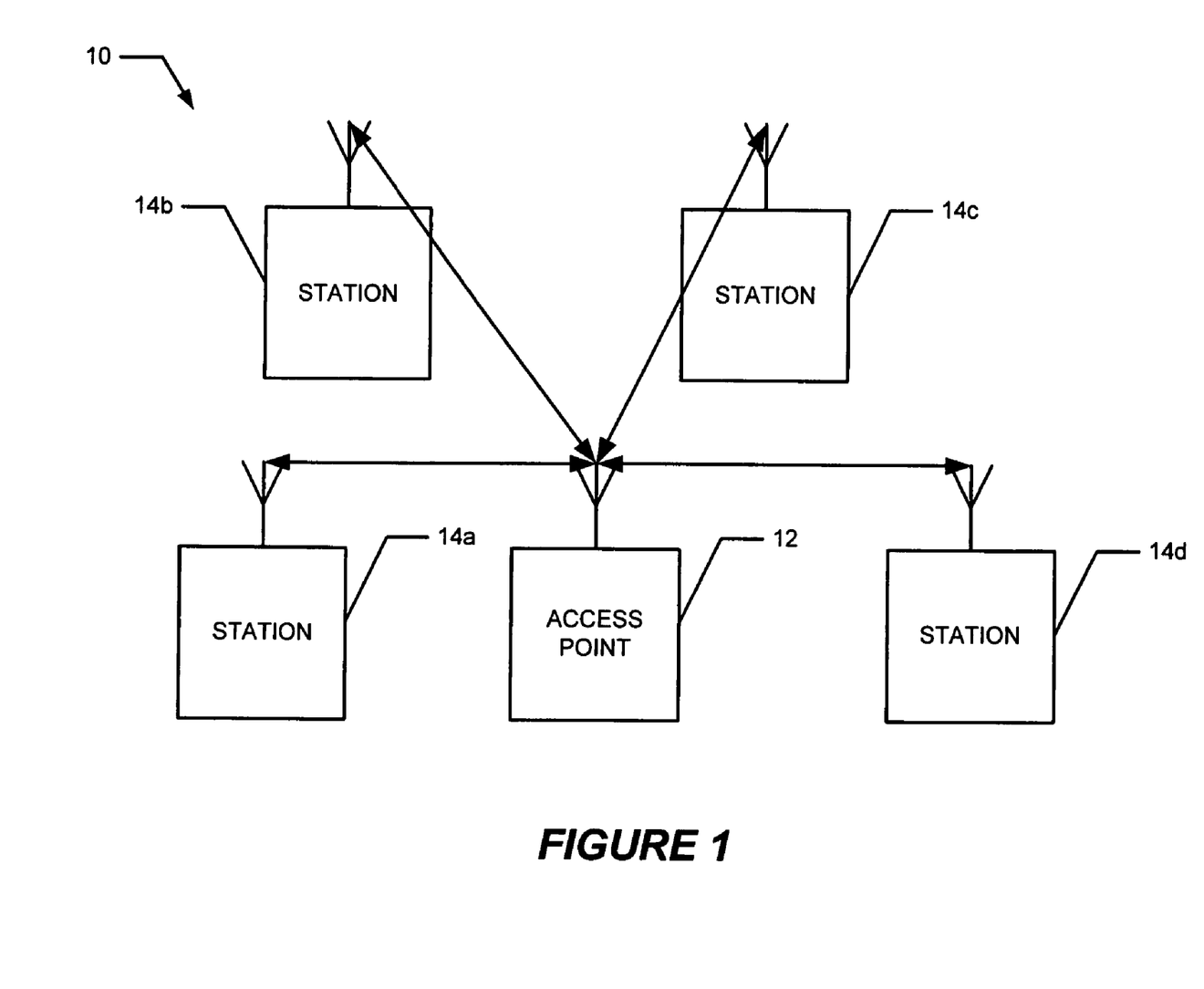
FIG. 1 depicts a block diagram of a particular embodiment of a wireless local area network environment in accordance with aspects of the present invention.

Referring to FIG. 1, a block diagram of a WLAN environment 10 in accordance with the present invention is shown. The environment 10 includes an AP 12 and a plurality of stations 14a-14d. While four stations are shown, it should be appreciated that any number of stations could be used. A station 14a-14d transmits frames over a wireless communications channel to the AP 12. A station 14a-14d is also capable of receiving frames over the wireless communication channel from the AP 12. A station is further capable of entering a power saving (PS) mode and of transmitting and receiving frames while in the power saving mode.

AP 12 receives frames from one or more stations 14a-14d via a wireless communications channel. AP 12 can also transmit frames to one or more stations 14a-14d via a wireless communications channel. AP 12 may further buffer downlink frames for a station which is in a doze state and may deliver the buffered downlink frames to the appropriate station when the station awakens from the doze state.

A station can prolong its battery life by powering off its radio when not transmitting or receiving. A station may be in one of two power management modes, an Active mode or a PS mode. As described above, frames destined for a station in PS mode may be buffered at the AP.

A station in PS mode may elect one of two methods for the delivery of its frames buffered at the AP while in the PS mode. One method is by using PS Polls. In PS polls, a station listens to a TIM to determine if the AP has buffered frames for the station. The station sends a PS Poll to the AP telling the AP that the station is awake. The AP sends a buffered frame to the station. If the frame has the "More Data" bit set, indicating that there are more buffered frames for the station, the station will send another PS Poll to get another buffered frame. This is repeated until the AP has no more frames for the station.

The other method is by using Automatic Power Saving Delivery (APSD). To use APSD, a station submits a Traffic Specification (TSPEC) request with the field APSD field set to indicate APSD is to be used (e.g. setting the APSD field to a 1). A TSPEC contains an estimate of the data traffic and associated requirements. All buffered frames associated with an admitted APSD TSPEC are transmitted during a service period. There are two types of service periods possible under APSD, unscheduled and scheduled, thus leading to two variants of APSD, namely Unscheduled APSD and Scheduled APSD. Unscheduled APSD can be used only with contention-based access, while Scheduled APSD can be used with both contention-based and polled access. APSD can be combined efficiently with traditional (legacy) power management features to accommodate mixed traffic.

It should be noted that in the environment involving the present invention, the TIM has been given an expanded definition. The TIM includes in addition to the traffic that is to be retrieved by legacy power save method also the traffic that is to be retrieved by Unscheduled APSD. The TIM and the More Data bit thus indicate whether any traffic is buffered at the AP. Since the TIM and the More Data bit reflect all buffered traffic, stations with non-periodic traffic are able to use Unscheduled APSD to retrieve traffic. The AP determines the end of the service period, as it deems appropriate. The AP may consider the priority of buffered frames, the quantity of buffered frames as well as other criteria in determining when to end the service period.

An unscheduled service period begins when the AP receives a Data/Null frame associated with the appropriate AC from the station. If admission control is mandatory for the traffic category of an admitted TSPEC, the service period ends after the AP has attempted to transmit all frames destined for the APSD station and associated with the admitted APSD TSPEC. Otherwise, the service period ends at the discretion of the AP, but not before the AP has attempted to transmit at least one frame destined for the APSD station.

Unscheduled APSD is more efficient than legacy power save for all traffic types, as a single trigger frame can retrieve multiple frames. Downlink frames are released from a triggered PS buffer by a trigger frame. A trigger frame is defined as a QoS-Data or QoS-Null frame, sent uplink by a PS-mode station, in which the User Priority (UP) maps to a trigger-enabled AC. Transmission of trigger frames is not implicitly allowed by admission of a downlink flow. If the trigger frame maps to an AC that has ACM=1, then the station must establish a suitable uplink flow before sending triggers. The combination of sending station and UP uniquely identifies a triggered PS buffer; and the trigger frame causes all frames to be released from that buffer.

The released frames are delivered during a triggered service period. The triggered service period begins after the AP acknowledges the trigger frame transmitted by the station. The frames released from the triggered PS buffer are delivered using the access parameters of the corresponding AC. The AP uses the EOSP bit that is carried in the QoS Control field to indicate the end of the triggered service period.

It should be clear that, for a particular station, the APSD buffer, the trigger frame, and the triggered service period are all per-AC. Therefore, if a non-AP station establishes flows that result in more than one trigger-enabled AC, the station must initiate triggered service periods separately for each such AC in order to retrieve all the buffered frames. The non-AP station must remain awake as long as there is at least one triggered service period still in progress. Downlink unicast QoS-Data frames associated with a trigger-enabled AC are temporarily held in the AC's triggered PS buffer.

In order for a station to receive call signaling and other control/maintenance frames arriving in an APSD buffer, the TIM and More Data bit indicate the presence of these frames at the AP. When there is a single TIM, the AC buffer from which frames will be released is not restricted to be the same as the AC of the trigger frame. The station cannot tell the AC of buffered frames from the TIM, and hence it may not be able to provide a trigger frame of the same AC as the buffered frames. As long as frames are released from a single triggered buffer per trigger frame, the AP determines the buffer for frame release. The AP preferably release frames from the highest priority AC that contains buffered frames. While the station must retrieve all its buffered frames, using a single TIM (and a single More Data bit) gives rise to ambiguity concerning the AC of the buffered frames, which may cause a problem for devices needing to perform other urgent tasks. With knowledge of the priority of buffered traffic, a station could retrieve top priority frames immediately; while lower priority frames are left to wait.

The use of more TIMs would increase channel overhead, while the use of a longer QoS control field would increase the frame size, neither of which are desirable. One alternative is to add some signaling information in existing fields that are currently transmitted but reserved. The bit(s) in the QoS control field of the DL frame that correspond to Queue Size on an uplink (UL) frame could be used for this signaling. These bits, referred to as Remaining Buffer (RB) bits, indicate whether there is data remaining in the buffer from which the frame was released. RB could be either binary or show the queue size. A station seeing the TIM indication would either wait until its next trigger (UL voice) frame before responding to a TIM indication, or send a trigger frame. The AP would respond with the highest priority frame buffered for the station. With the RB indication, the station has sufficient information to do what is needed.

Figure 2:
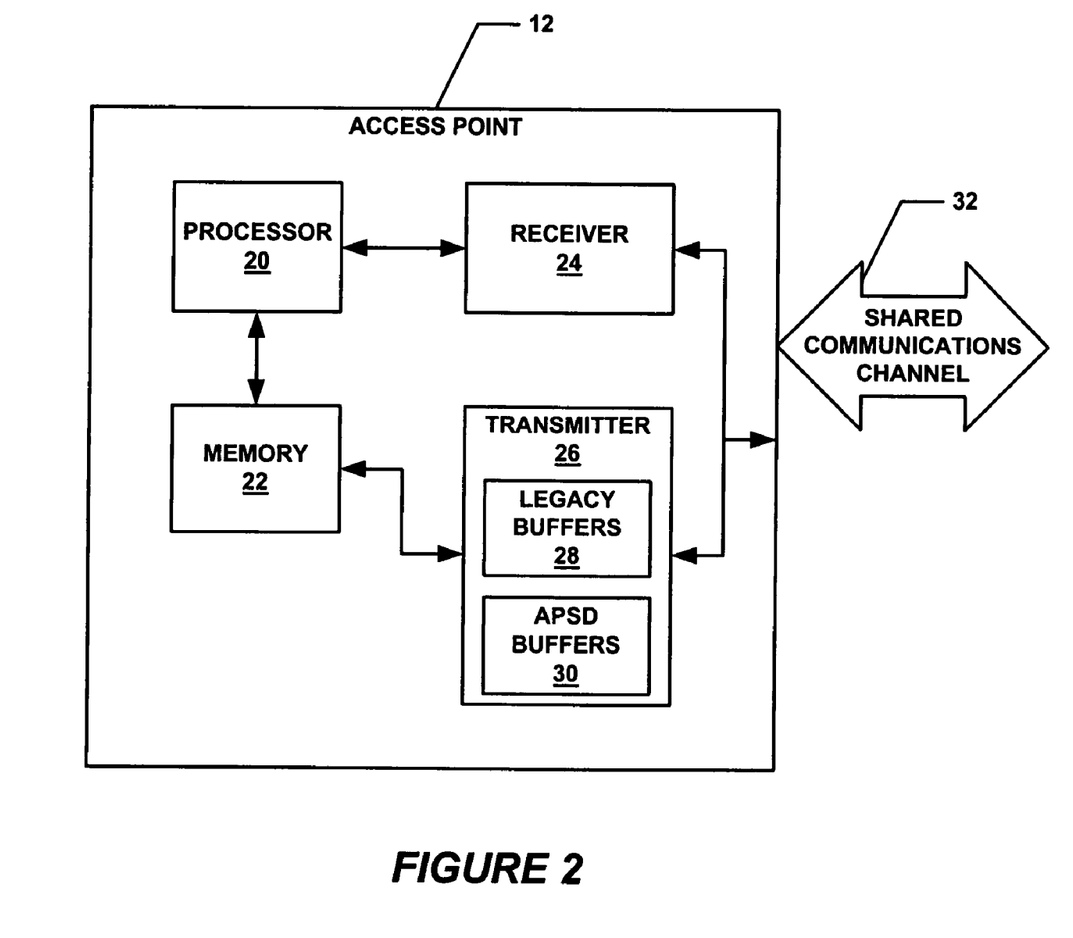
FIG. 2 depicts a block diagram of the salient components of an access point, in accordance with the illustrative embodiment of the present invention.

Referring now to FIG. 2, a block diagram showing salient components of a particular embodiment of an AP is shown. AP 12 includes processor 20, memory 22, receiver 24, and transmitter 26, interconnected as shown. Transmitter 26 includes legacy buffers 28 and APSD buffers 30.

Processor 20 is a general-purpose processor that is capable of executing instructions stored in memory 22, of reading data from and writing data into memory 22, and of executing various processes. Memory 22 is capable of storing programs and data used by processor 20, and might be any combination of random-access memory (RAM), flash memory, disk drive, and the like.

Receiver 24 is a circuit that is capable of receiving frames from shared communications channel 32, and of forwarding the received frames to processor 20. Transmitter 26 is a circuit that is capable of receiving frames from processor 20, and of transmitting the frames on shared communications channel 32. The transmitter includes at least one legacy buffer 28 and at least one APSD buffer 30. In order to avoid confusion on the signaling mechanism to be used for the delivery of buffered frames while stations in a WLAN engage in power saving, an AP 12 that supports APSD maintains one legacy PS buffer 28 for each non-APSD-capable station and at least one APSD buffer 30 per APSD-enabled station. Legacy buffers are not is maintained for APSD-enabled stations. An APSD enabled station is one that has indicated to the AP 12 its ability to use APSD signaling. Such a station utilizes APSD signaling to retrieve frames buffered at the AP.

All downlink frames destined to an APSD-enabled station in the sleep state are held in one of the APSD buffers 30. Which buffer that is depends on the frame's priority. For maximum prioritization, there is one APSD PS buffer for each AC and for each APSD-enabled station. Each APSD buffer would then hold frames corresponding to a different AC. An AP may maintain, however, fewer PS buffers per station than the number of APs in order to reduce cost or complexity. In such a case, frames corresponding to two different APs may be held in the same buffer.

In a particular embodiment, the AP includes a processor, a memory in communication with the processor, a receiver in communication with the processor and with a shared communications channel, and a transmitter in communication with the processor and with said shared communications channel. The transmitter includes a legacy power saving buffer for each non-Automatic Power Save Delivery (APSD) station of a Wireless Local Area Network (WLAN) said AP is in communication with, at least one APSD buffer for each APSD enabled station of said WLAN. During a service period, frames from the at least one APSD buffer are transmitted by the transmitter across said shared communications channel to an APSD enabled station.

The AP may further include one APSD buffer for each Access Category (AC) for each APSD enabled station or may include one APSD buffer for multiple Access Categories (APs) for each APSD enabled station. In either case, the APs of frames in one APSD buffer have a different priority level than other APs of frames of another buffer.

Frames are transmitted from a single APSD buffer of the transmitter during a service period. Preferably, the frames are transmitted from a buffer containing highest priority frames. The frames may be transmitted from a same Enhanced Distribution Channel Access (EDNA) access/transmit buffer. The service period is ended by the AP when the AC corresponding to the next frame to be released changes.

Figure 3:
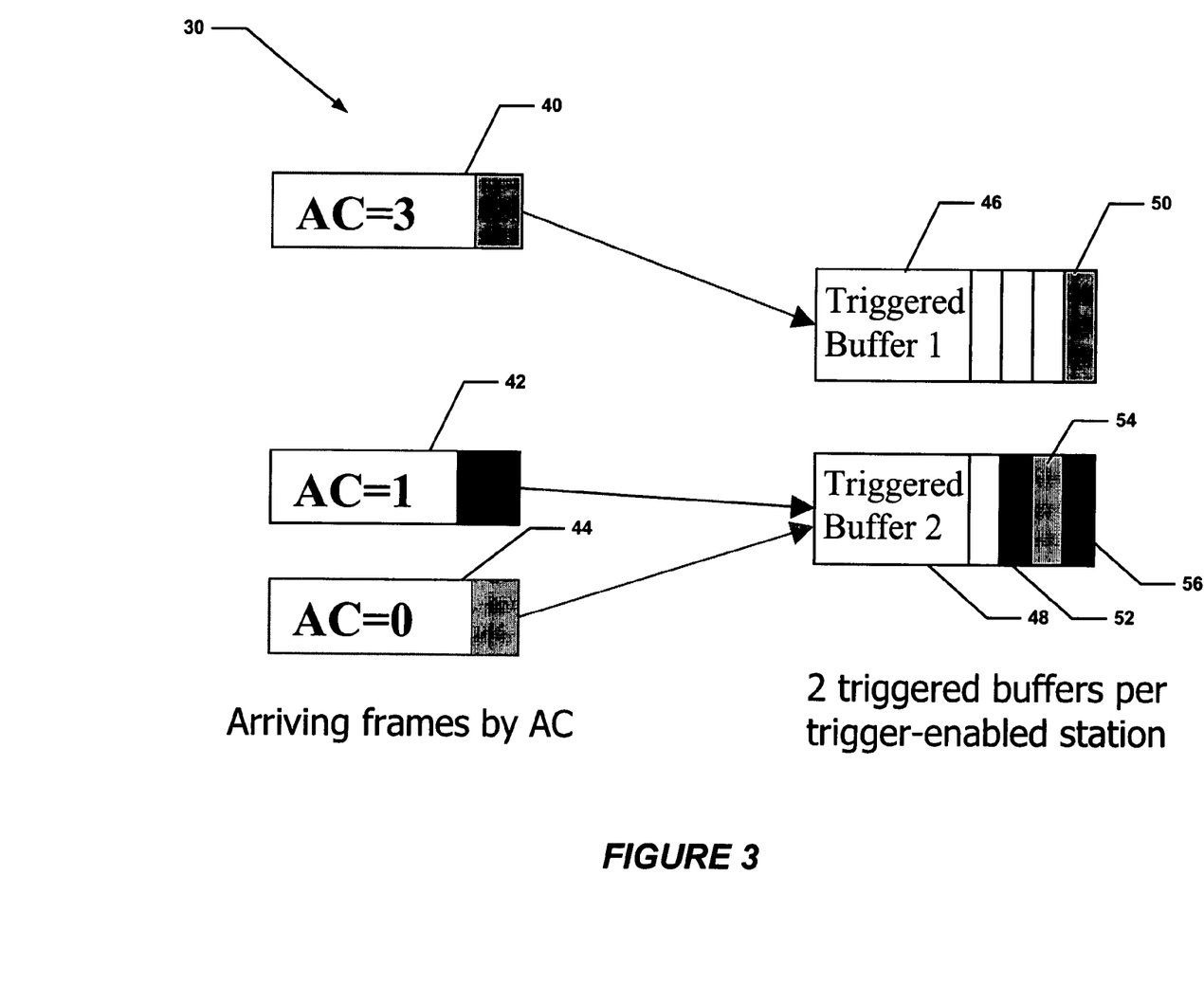
FIG. 3 depicts a diagram showing the organization of a particular arrangement wherein there are fewer trigger buffers than AC frames.

The mapping of APs to buffers may change dynamically as the priority mix of downlink frames arriving at the AP may vary over time. The mapping at any point in time is preferably monotonic; i.e. the APs of the frames contained in one APSD buffer have priority either higher or lower than those of another buffer. FIG. 3 illustrates how APs may be mapped into APSD buffers. The downlink frames arriving at the AP for a particular station correspond to ACs 3, 1, and 0 (numbered 40, 42 ad 44 respectively). If there are two APSD buffers at the AP allotted per station, frames with priority corresponding to AC=3 are held in one buffer, and frames with priority corresponding to AC=1 and Ac=0 are held in the other buffer. Clearly, the first APSD buffer 46 contains higher priority frames than the second APSD buffer 48. Buffer 46 contains frame 50 having a priority level AC=3, while buffer 48 contains frames 52 and 56 from AC 42 having a priority level of 1, and also frame 54 from AC 44 having a priority level of 0.

When a service period (either scheduled or unscheduled) starts for a station, the AP will release frames to be sent to the station. This may be accomplished using Enhanced Distributed Channel Access (EDCA), a best-efforts mechanism in which devices negotiate for bandwidth based on up to eight levels of priority using traditional 802.11 probabilistic methods. Certain precautions are taken in order to avoid frame arrival out of sequence, which is possible when frames of different ACs are sent using EDCA, causing the frame with the EOSP bit set to be received before other frames released in the same service period. One precaution is to always send frames from a single buffer per service period. It is the buffer containing the highest priority frames—the first buffer 46, in this example. The EOSP bit is set in the last released frame. Although more frames are queued in another buffer (e.g., buffer 48), the AP will wait for a new service period to release those frames. In addition to releasing frames from a single buffer during a service period for a particular station, the released frames must all use the same EDCA access/transmit buffer.

Figure 4:
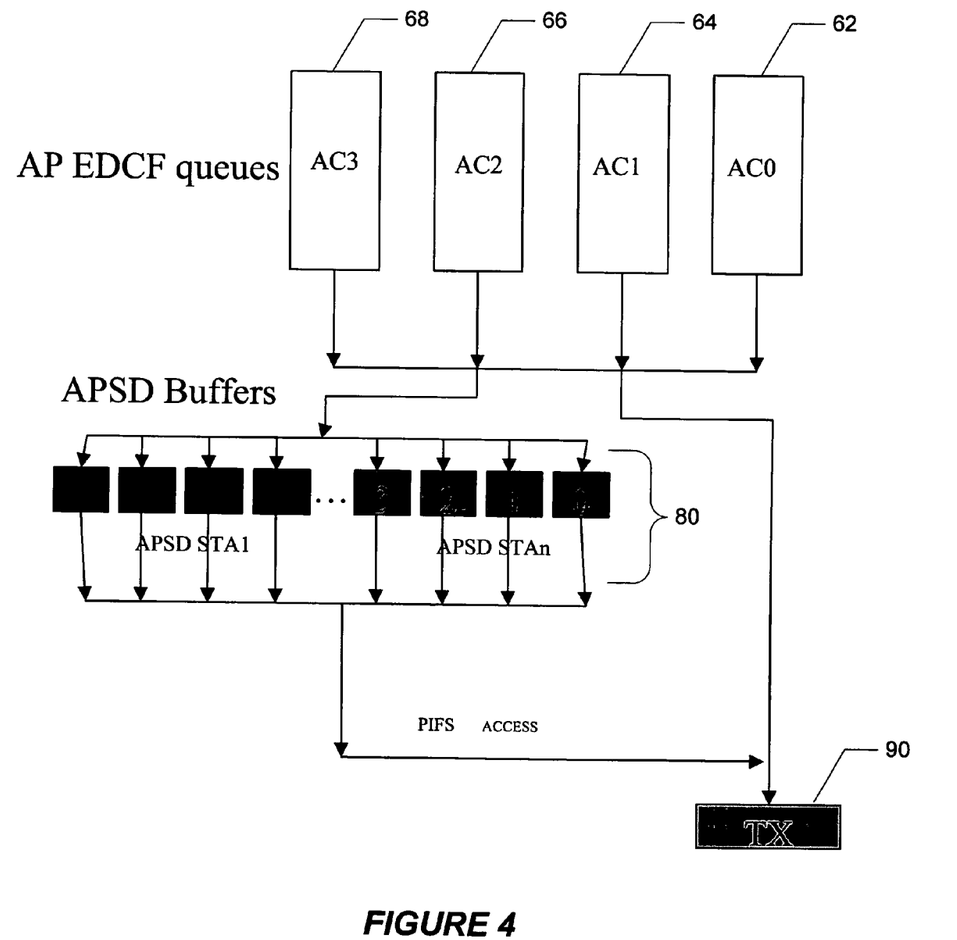

Referring now to FIG. 4, a block diagram of a environment including multiple AP EDCF queues 62, 64, 66 and 68 in communication with a plurality of APSD buffers 80 and a single transmit buffer 90 is shown.

There are several ways to ensure that the same EDCA access/transmit buffer will be used for all the frames released for a station during a service period. When using a different buffer for each AC, it is sufficient to release frames from a single buffer in each service period. If frames corresponding to multiple ACs are queued in a triggered buffer, one could end the service period when the AC corresponding to the next frame to be released changes. Alternatively, the frames can be released into the same access/transmit buffer. The buffers are organized so that released frames from all ACs go through the same transmit buffer. The above-described architecture described here ensures that the last frame sent by the AP will be the one with the EOSP bit set.

While operating under legacy power management, a station can have its downlink traffic buffered when it is asleep. The station requests buffering of its traffic by setting the power management bit "ON" in the frame control field of a frame transmitted uplink. When the station wakes up, the station can receive its frames by indicating that it is awake. This can be done in two ways: the first way is by setting the power management bit "OFF" in the frame control field of its frames uplink, and the second way is by sending a PS (power saving) poll to request the transmission of a single frame.

When the first method is used, the AP notifies the station when the all buffered frames have been transmitted and the buffer is empty by setting the more data bit in the last frame transmitted to a station "OFF". If the station has no more uplink frames to send, it can go back to sleep after acknowledgement has been sent for the last buffered frame. If more frames are pending uplink transmission, the station can stay awake to transmit these frames, and will go to sleep, provided the acknowledgements received from the AP continue to indicate that there are no frames buffered. When the station goes back to sleep, it can turn the power management bit "ON" in the frame control field of either the ACK to the last downlink frame received, or in the frame control field of the last uplink frame sent. All retransmissions of frames lost or received with errors will occur during the time interval when the power-saving bit is "OFF".

The legacy power saving mechanism can be combined with new features of the 802.11e draft standard to yield a more efficient power saving mechanism. Specifically, the new QoS frame format allows the AP to indicate whether a QoS frame is the last frame to be transmitted in the present wake-up period by setting the last bit in the QoS control field. This flag is different from the more data bit in the frame control field, used to signal that there are more frames buffered at the AP for the destination station. The capability to indicate both is useful when the AP must postpone certain downlink transmissions in order to meet QoS requirements. A station that goes to sleep having received a downlink frame with both the Last bit "ON" and the More Data bit "ON" may send a null frame with Power Management bit "OFF" to receive the remaining buffered frames at a later time.

A power-saving station can find out whether there is buffered traffic at the AP by reading the beacon TIM, which indicates so. If, however, a station has a reason to wake up and transmit uplink frequently (that is, at time interval shorter than the beacon period), there is no need to wake up in order to listen to the beacon TIM. The more data bit in the acknowledgement lets the station know of its buffered frames pending transmission.

An example of this arises during a VoIP call. In general, a station capable of VoIP calling is typically in one of two modes: Stand-by mode or Active mode. In the stand-by mode the station is powered on but does not engage in calling. A station in stand-by mode may receive or send signaling traffic during the initiation of a call. In the active mode the station is engaged in a call, or equivalently, generates and receives traffic periodically. A station exchanging traffic with the AP that is not symmetric can operate as in stand-by VoIP mode. A station sending periodic traffic streams uplink without receiving a periodic downlink stream can operate as in the VoIP active mode, provided that the delay tolerance for downlink frames is not less than the interarrival time of the periodic uplink stream. The 'legacy' power saving mechanism in 802.11-1999 can be used for both modes.

If silences are not suppressed during a VoIP call, there will be frames generated periodically along both directions, uplink and downlink. In that case, the station wakes up to transmit its uplink frames. Having been notified of the existence of buffered downlink frames by the more data bit in the acknowledgement frame, the station stays awake to receive its buffered frames.

With silence suppression at the station, there are two possible modes of operation. The station may wake up periodically and transmit null frames. Acknowledgement of uplink frames indicate whether downlink frames are pending transmission, and hence the station stays awake to receive its buffered frames, as described above. Alternatively, the station may listen to the beacon TIM to ascertain the same. The advantage of the second method is that less power is used if the downlink side were silent, too. If the downlink side is sending frames, it is preferable to send a null frame at the service period, as less power would be used. The station will have omitted powering on for the TIM. Preferably, the two approaches are combined.

The station does not wake up for the beacon TIM if there is periodic uplink data with period less than or equal to the tolerance for downlink delay. If the station has no uplink data for at least a service interval (period of the stream), the station wakes up to listen to the TIM. The station will continue to do so until either uplink or downlink data arrives. If the TIM indicates downlink data buffered at the AP for the station, and if the station continues to have no uplink data, the station starts waking up at the service interval and sends null frames uplink, in order to signal that it is awake and ready to receive downlink data. If uplink data is generated, the station will send the uplink frame instead of the null frame.

The logic of station operation under the Legacy power-saving rules is outlined below. It is assumed that the downlink service interval specified is shorter than the TIM beacon interval.

The station will go to sleep and wake up to listen to the beacon TIM periodically to check whether there is buffered traffic, unless there is periodic uplink traffic generated by the station with a shorter service interval than the TIM beacon interval. If buffered traffic is indicated, the station will send a null frame with the Power Management bit "OFF" in the frame control field, signaling to the AP that it is awake. If no buffered traffic is indicated, the station will repeat waking up to listen to the beacon TIM at the next beacon interval.

If uplink traffic is generated periodically with a shorter period than the TIM beacon interval, the station will wake up and send uplink frame(s) as they arrive.

An 802.11 station can prolong its battery life by powering off its radio when not transmitting or receiving. The efficiency of the protocol determining when a station should wake up in order to send and/or receive transmissions destined to it will depend on the type of traffic involved. The traffic may be periodic in one or both directions, and have different priorities. The 802.11 e draft standard provides two mechanisms for power-saving delivery: The Power Management mechanism in the 802.11-1999 standard, referred to here as the 'legacy' mechanism, and the APSD (Automatic Power Saving Delivery) mechanism. The latter is designed to improve QoS performance by taking advantage of the periodic nature of VoIP and other synchronous downlink streams. The legacy mechanism can also be used for VoIP calls, but less effectively. The two mechanisms can be combined and used for bidirectional periodic streams.

An uplink frame with the Power Management bit "OFF" in the frame control field will signal the AP that the power-saving station is awake.

The station will stay awake until it has transmitted all its uplink frames and has received notice from the AP that either there are no buffered frames pending transmission, or downlink transmission of buffered frames is postponed. A downlink frame with the More Data bit "OFF" in the frame control field, will signal that there are no more downlink frames pending transmission. A downlink frame with the Last bit "ON" in the QoS control field, signals that the AP will not transmit more downlink frames during this wake-up period.

Having received a downlink frame with either the More Data bit "OFF" or the Last bit "ON", a station shall indicate in its last frame that it is going back to sleep. The last frame will be either the last uplink MSDU or an ACK to the last downlink frame.

If the last uplink transmission is an uplink MSDU, the station will stay awake until the expiration of the NAV or until it receives an ACK, whichever occurs first. If an ACK is not received, it will retransmit the frame.

If the last frame is an ACK to a downlink frame, the station will stay awake until it receives another transmission starting at PIFS following ACK timeout. If no such transmission occurs the station can go to sleep. If the transmission is not directed to itself, the station can go to sleep. Otherwise the station will acknowledge receipt of the frame and stay awake until it receives another transmission starting at PIFS following ACK timeout. This feature is used to safeguard against repeated retransmissions by the AP. It avoids unanswered retransmissions when the ACK to the last downlink frame is missed and the station has gone to sleep.

A station that goes to sleep having received a downlink frame with the Last bit "ON" and the More Data bit "ON" may subsequently send a null frame with Power Management bit "OFF" to receive the remaining buffered frames.

During AP 'Legacy' operation, the AP sends frames buffered for a power saving station as soon as the station wakes up. That is indicated when a frame is received from that station with the Power Management bit "OFF" in the frame control field. Downlink data is piggybacked with any pending ACKs to uplink data from the station. If there is no frame to send in a cycle, it sends nothing.

Receipt of a frame with the Power Management bit "ON" in the frame control field indicates that the station sending the frame is in sleep mode. The AP buffers the frames destined to a station in power saving mode. The More Data bit in the frame control field is "ON" for all buffered frames except the last, in which the same is set "OFF".

The Last bit in the QoS control field is "OFF" for all downlink frames sent to a station until the AP determines that other downlink transmissions have precedence, in which case the AP sends downlink frames with the Last bit "ON". If the AP that receives an uplink frame from a station for which it has no buffered data, it will set the More Data bit "OFF" in the ACK sent to that station.

In order to accomplish QoS Prioritization under 'Legacy' Power Management, requirements, separate EDCF buffers are used to store frames by their priority at the station Buffers are emptied using the rules of EDCF contention. To preserve battery life, a station may wake up either when delay-sensitive traffic (high priority EDCF traffic) arrives at its buffer, or after the uplink frames have reached a specified age, at which point the station will transmit uplink frames with the same TXOP. The station will stay awake to receive the frames that are buffered at the AP. If all the frames are not sent by the AP while the station wakes up for transmission of uplink frames, the station will wake up subsequent to being notified that there are downlink frames remaining buffered at the AP in order to receive these frames. All priority queues at the station will contend while the station is awake. Channel contention for uplink transmission may be interrupted and the station may go to sleep in order to avoid a long contention period and heavy battery drain.

The user priority of the uplink frame serving to notify the AP that the station is awake need not restrict the user priority of the buffered frame transmitted in response. In general, the higher-priority frames will be transmitted before lower priority frames, unless other algorithms are adopted at the AP to account in addition to priority, the age of the buffered frame and its remaining life.

VoIP calling using the APSD Mechanism is designed for periodic downlink traffic streams. It applies to both symmetric and non-symmetric traffic streams. The legacy power-saving rules apply when operating under APSD. In addition, a station operating in APSD mode indicates in a TSPEC request the rate at which downlink frames will be generated. The AP will schedule the time of downlink frame delivery to the station, notifying the station of this schedule in its TSPEC response. The station must wake up to receive downlink frames according to that schedule. It should be noted that APSD applies to non-symmetric periodic streams, such as audio and video.

APSD can be combined with legacy power saving in order to accommodate both periodic and non-periodic traffic. When the downlink traffic is not periodic, a station can use the legacy power management method described above. For instance, when in stand-by mode, a station would listen to the TIM beacon and send an uplink frame to receive all buffered frames. If the AP receives a frame with the Power Management bit "OFF" in the frame control field, the AP will send frames buffered for that station, regardless of whether this occurs at the scheduled wake up time. A station would not need to wake up to find out from the TIM whether there are downlink frames waiting if there is an APSD downlink stream scheduled.

In general, a power-saving station can transmit uplink transmissions at any time. There are benefits derived, however, from coordinating uplink transmission with the APSD schedule. APSD can be used with both channel access mechanisms, distributed random access (as in EDCF) and centralized polled access (as in HCF polling). If a station with an admitted APSD TSPEC uses EDCF access, it is efficient to send uplink frames at the specified APSD schedule. Otherwise, a station would have to expend additional energy for powering up at a different time to transmit. When using polled access, the AP will send a poll combined with the downlink data; both will be transmitted according to the specified schedule. In addition to the power savings during power-up mentioned above, piggybacking a poll enables uplink transmissions to occur without contention. The APSD service interval should be short enough to accommodate all downlink APSD streams. A power-saving station will be polled with an aggregate schedule for all traffic streams.

To summarize, a station will use the Legacy power saving mechanism unless there is a downlink APSD TSPEC request admitted for the station with a service interval shorter than the TIM beacon interval, in which case it employs APSD as described below.

If there is a downlink APSD TSPEC admitted for a station with a longer service interval than the TIM beacon interval, the station will engage in both the Legacy power saving mechanism and APSD as described below. Null uplink frames with the Power Management bit "OFF" in the frame control field will be sent when the station wakes to receive buffered frames, provided that it is not due to wake up shortly according to the APSD schedule.

The operation of the station and the AP under APSD is described in more detail below for each of the two access modes.

Station APSD Operation

EDCF access—The station wakes up periodically at the TSPEC-specified schedule and sends any buffered uplink frames.

If there is no frame to send in a cycle, the station waits to receive a downlink transmission. If a transmission is received but it is not directed to itself, the station will go to sleep. The station will stay awake for a specified time (e.g. SIFS plus the transmission time of two data frames and an ACK) and if no transmission is received, it goes to sleep.

The station will stay awake until it has transmitted all its uplink frames and has received notice from the AP that there are no buffered frames pending immediate transmission. A downlink frame with the More Data bit "OFF" in the frame control field, signals that there are no more downlink frames pending transmission. A downlink frame with the Last bit "ON" in the QoS control field, signals that the AP need not transmit more downlink frames during this wake-up period.

Having received a downlink frame with either the More Data bit "OFF" or the Last bit "ON", a station shall acknowledge receipt of the frame and stay awake until it receives another transmission starting at PIFS following ACK timeout. If no such transmission occurs the station will go to sleep. If the transmission is not from the AP, or not directed to itself, the station will go to sleep. Otherwise the station will acknowledge receipt of the frame and stay awake until it receives another transmission starting at PIFS following ACK timeout.

A station that goes to sleep having received a downlink frame with the Last bit "ON" and the More Data bit "ON" may send a null frame with Power Management bit "OFF" to receive the remaining buffered frames.

Polled access—The station wakes up periodically at the TSPEC-specified schedule and waits to be polled. Uplink data is piggybacked with ACKs. After a specified time expires without receiving a poll, the station sends a frame uplink using EDCF access.

The station will stay awake until it has transmitted all its uplink frames and has received notice from the AP that there are no buffered frames pending immediate transmission. A downlink frame with the More Data bit "OFF" in the frame control field, signals that there are no more downlink frames pending transmission. A downlink frame with the Last bit "ON" in the QoS control field, signals that the AP need not transmit more downlink frames during this wake-up period.

Having received a downlink frame with either the More Data bit "OFF" or the Last bit "ON", a station shall acknowledge receipt of the frame and stay awake until it receives another transmission starting at PIFS following ACK timeout. If no such transmission occurs the station can go to sleep. If the transmission is not from the AP, or not directed to itself, the station can go to sleep. Otherwise the station will acknowledge receipt of the frame and stay awake until it receives another transmission starting at PIFS following ACK timeout. 3

A station that goes to sleep having received a downlink frame with the Last bit "ON" and the More Data bit "ON" may send a null frame with Power Management bit "OFF" to receive the remaining buffered frames.

AP APSD Operation

EDCF Access—Active Mode

The AP sends any buffered frames at the TSPEC-specified schedule. Downlink data is piggybacked with any pending ACKs to uplink data from the station. If there is no frame to send in a cycle, it sends nothing.

Receipt of a frame with the Power Management bit "ON" in the frame control field indicates that the station sending the frame is going to sleep mode.

The AP buffers the frames destined to a station in power saving mode.

The More Data bit in the frame control field is "ON" for all buffered frames except the last, in which the same is set "OFF".

The Last bit in the QoS control field is "OFF" for all downlink frames sent to a station until the AP determines that other downlink transmissions have precedence, in which case the AP sends downlink frames with the Last bit "ON". Once a frame has been sent to a station with the Last bit "ON", the AP may send additional frames to the same station, provided the station remains awake.

If the AP that receives an uplink frame from a station for which it has no buffered data, it will set the More Data bit "OFF" in the ACK sent to that station.

Polled Access—Active Mode

The AP polls station starting at the TSPEC-specified schedule. Downlink data is piggybacked with polls to the station and ACKs to uplink data. Polling continues as indicated by the More Data bit (or the queue size) in the poll response Receipt of a frame with the Power Management bit "ON" in the frame control field indicates that the station sending the frame is going to sleep mode. The AP buffers the frames destined to a station in power saving mode. The More Data bit in the frame control field is "ON" for all buffered frames except the last, in which the same is set "OFF".

The Last bit in the QoS control field is "OFF" for all downlink frames sent to a station until the AP determines that other downlink transmissions have precedence, in which case the AP sends downlink frames with the Last bit "ON". Once a frame has been sent to a station with the Last bit "ON", the AP may send additional frames to the same station, provided the station remains awake. If the AP has no buffered data, it will set the More Data bit "OFF" in the poll sent to that station.

QoS Prioritization Under APSD

As in the case of Legacy power saving, QoS requirements are best served when the AP is free to send downlink frames as soon as possible, or according to the criteria employed in a scheduling algorithm. In general, the higher-priority frames will be transmitted before lower priority frames, unless other algorithms are adopted at the AP to account, in addition to priority, the age of the buffered frame and its remaining life. That means that downlink transmission of frames buffered at the AP should be allowed to occur when the station wakes up, regardless of what causes the station to wake up. That is, regardless of whether the station follows the APSD schedule, or sends uplink frames with the Power Management bit "OFF" in the frame control field according to the legacy power-saving method.

All TSPEC requests from stations employing APSD will use the same service interval. If access is achieved by polling, the AP should supply an aggregate polling schedule.

Buffers at the AP are emptied when the station is off the power saving mode. Using the PIFS access rule (the AP accesses the channel if it has been idle for a time interval of duration PIFS), the higher priority queues are typically emptied first, followed by the lower priority. Downlink transmission to a station that is awake may stop before the buffers are all empty if the AP has higher priority traffic pending for other stations. The last bit will be used to notify a station that no more downlink frames will be sent while it is still awake, and it may thus go sleep. A station that goes to sleep having received a downlink frame with the Last bit "ON" and the More Data bit "ON" may subsequently send a null frame with Power Management bit "OFF" using EDCF access in order to receive the remaining buffered frames.

A comparison of 'Legacy' and APSD will now be discussed. Advance knowledge of the station wake-up schedule in APSD enables the station to wake up when the AP is ready to transmit downlink frames. It is not necessary to be prompted by the station with uplink frames notifying that it is awake. Hence, APSD is efficient for both symmetric (e.g.

voice) and asymmetric (e.g. video) periodic streams. APSD, when used with either EDCF or polled access, increases channel utilization efficiency because the station need not stay awake waiting for the AP to complete other transmissions and TXOPs before sending buffered data to the power-saving station. Doing otherwise would cause battery drain, delay and jitter. HCF polling combined with APSD gives even better results in terms of battery life. Piggybacking data with a poll or an acknowledgement reduces channel overhead. Polling further eliminates power consumption as the station avoids contention for the channel to send its uplink frame.

Figure 5A:
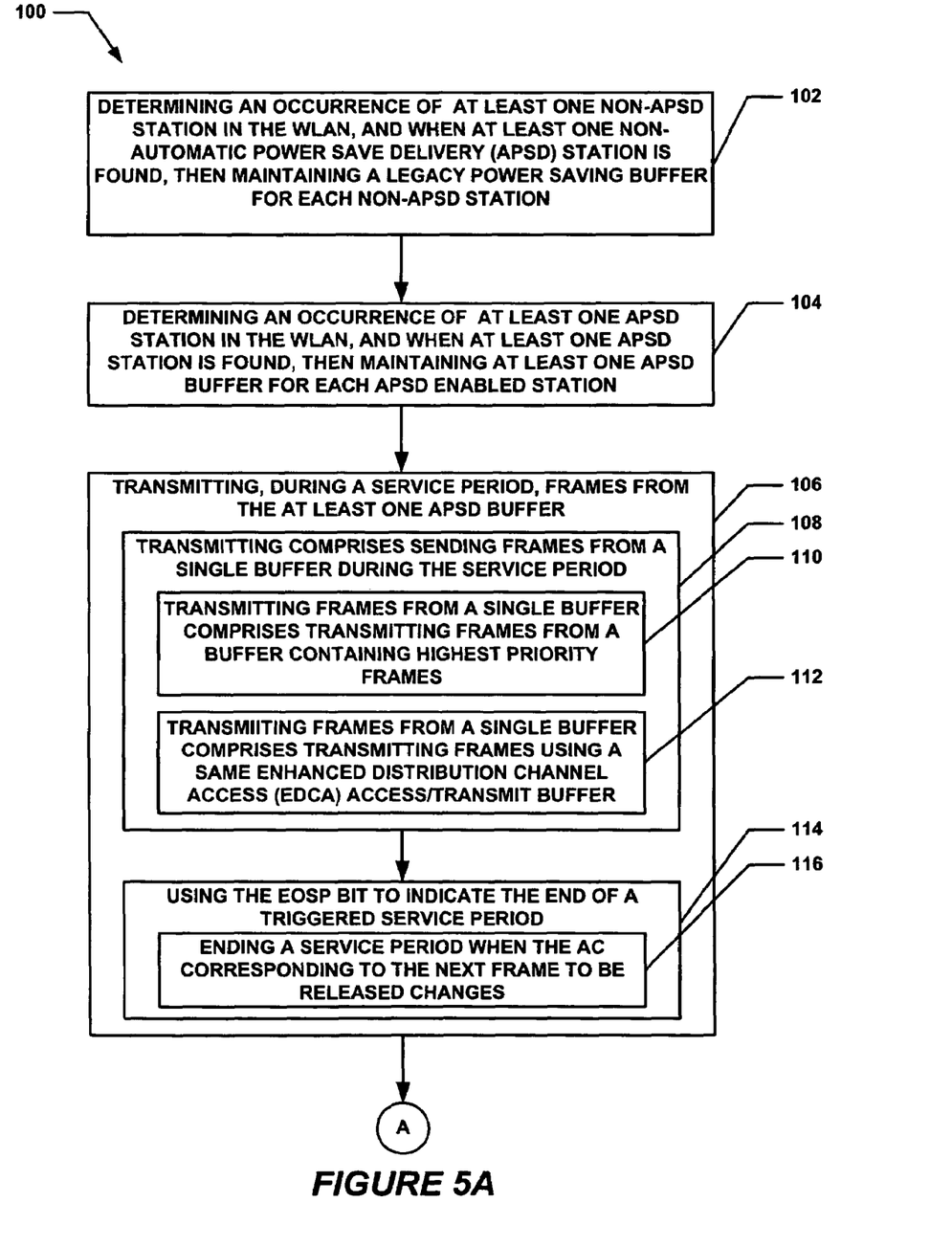
FIGS. 5A and 5B comprise flow diagrams of a particular embodiment of a method for conveying the priority of buffered frames to power saving stations in wireless local area networks in accordance with aspects of the present invention.
Figure 5B:
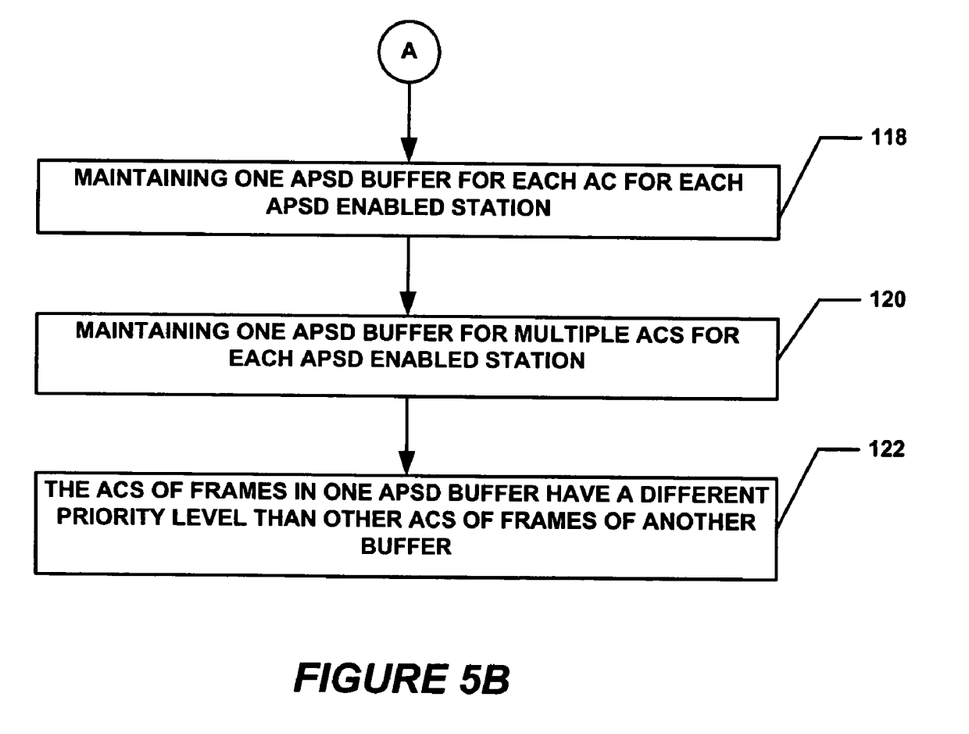

A flow chart of the presently disclosed method is depicted in FIGS. 5A and SB. The rectangular elements are herein denoted "processing blocks" and represent computer software instructions or groups of instructions. Alternatively, the processing and decision blocks represent steps performed by finctionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 5A and 5B, a method 100 of providing delivery of buffered frames in a Wireless Local Area Network (WLAN) is shown. The method 100 stats with processing block 102 wherein a determination is made regarding an occurrence of at least one non-APSD station in the WLAN. When at least one non- Automatic Power Save Delivery (APSD) station is found, then a legacy power saving buffer is maintained for each non-APSD station.

In processing block 104, a determination is made regarding an occurrence of at least one APSD station in the WLAN. When at least one APSD station is found, then at least one APSD buffer is maintained for each APSD enabled station.

In processing block 106, frames from at least one APSD buffer are transmitted during a service period. As shown in processing block 108, the transmitting comprises sending frames from a single buffer during the service period. Further, as recited in processing block 108, transmitting frames from a single buffer comprises transmitting frames from a buffer containing highest priority frames. Further still, as depicted in processing block 112, transmitting frames from a single buffer comprises transmitting frames using a same Enhanced Distribution Channel Access (EDCA) access/transmit buffer.

In processing block 114, the End Of Service Period (EOSP) bit is used to indicate the end of a triggered service period.

In processing block 116, transmitting frames from a single buffer further comprises ending a service period when the AC corresponding to the next frame to be released changes. In such a manner, the last frame sent is guaranteed to transmit the End of Service Period (EOSP) bit.

In processing block 118, the method 100 further includes maintaining one APSD buffer for each AC for each APSD enabled station. The method could also include, as shown in processing block 120, maintaining one APSD buffer for multiple ACs for each APSD enabled station. In either situation, as recited in processing block 122, the ACs of frames in one APSD buffer have a different priority level than other ACs of frames of another buffer.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. An Access Point (AP) comprising:
a processor;
a memory in communication with said processor;
a receiver in communication with said processor and with a shared communications channel; and
a transmitter in communication with said processor and with said shared communications channel, wherein said transmitter includes a plurality of legacy power saving buffers, one of said plurality of legacy power saving buffer for each non-Automatic Power Save Delivery (APSD) station of a Wireless Local Area Network (WLAN), wherein said AP is in communication with a plurality of APSD buffers, at least one APSD buffer for each APSD enabled station of said WLAN, and wherein, during a service period, frames from said at least one APSD buffer are transmitted by said transmitter across said shared communications channel to an APSD enabled station, wherein frames of one of said plurality of legacy power saving buffers has a higher priority than frames of another one of said plurality of legacy power saving buffers, and wherein said frames of said higher priority legacy power saving buffer are transmitted before frames of said another legacy power saving buffer.

2. The AP of claim 1 wherein an End Of Service Period (EOSP) bit is used to indicate the end of a triggered service period.

3. The AP of claim 1 wherein said at least one APSD buffer for each APSD enabled station further comprises one APSD buffer for each Access Category (AC) for each APSD enabled station.

4. The AP of claim 1 wherein said at least one APSD buffer for each APSD enabled station further comprises one APSD buffer for multiple Access Categories (ACs) for each APSD enabled station.

5. The AP of claim 4 wherein the ACs of frames in one APSD buffer have a different priority level than other ACs of frames of another buffer and the ACs in one all have either higher or lower priority than the ACs in the other.

6. The AP of claim 4 wherein frames are transmitted from a single APSD buffer during said service period.

7. The AP of claim 6 wherein frames are transmitted from a buffer containing highest priority frames.

8. The AP of claim 6 wherein frames are transmitted from a same Enhanced Distribution Channel Access (EDCA) access/transmit buffer.

9. The AP of claim 8 wherein said service period is ended by said AP when the AC corresponding to the next frame to be released changes.

10. The AP of claim 1 wherein frames are only sent from a single buffer containing highest priority frames and wherein frames queued in another buffer wait for a new service period before being transmitted.

11. A computer-implemented method in which a computer system performs operations providing delivery of buffered frames in a Wireless Local Area Network (WLAN) comprising:
   determining an occurrence of a plurality of non-Automatic Power Save Delivery APSD stations in said WLAN, and when a plurality of non-APSD station is found, then maintaining a legacy power saving buffer for each non-APSD station;
   determining an occurrence of a plurality of APSD stations in said WLAN, and when a plurality of APSD stations are found, then maintaining at least one APSD buffer for each APSD enabled station; and
   transmitting, during a service period, frames from said at least one APSD buffer, wherein frames of one of said plurality of legacy power saving buffers has a higher priority than frames of another one of said plurality of legacy power saving buffers and wherein said frames of said higher priority legacy power saving buffer are transmitted before frames of said another legacy power saving buffer.

12. The method of claim 11 further comprising using an End Of Service Period (EOSP) bit to indicate the end of a triggered service period.

13. The method of claim 11 further comprising maintaining one APSD buffer for each Access Category (AC) for each APSD enabled station.

14. The method of claim 11 further comprising maintaining one APSD buffer for multiple ACs for each APSD enabled station.

15. The method of claim 11 wherein the ACs of frames in one APSD buffer have a different priority level than other ACs of frames of another buffer.

16. The method of claim 11 wherein said transmitting comprises sending frames from a single APSD buffer during said service period.

17. The method of claim 16 wherein said transmitting frames from a single buffer comprises transmitting frames from a buffer containing highest priority frames.

18. The method of claim 16 wherein said transmitting frames from a single buffer comprises transmitting frames using a same Enhanced Distribution Channel Access (EDCA) access/transmit buffer.

19. The method of claim 16 wherein said transmitting frames from a single buffer further comprises ending a service period when the AC corresponding to the next frame to be released changes.

20. The method of claim 11 further comprising sending frames from only a single buffer containing highest priority frames and wherein frames queued in another buffer wait for a new service period before being transmitted.

* * * * *